Patented May 19, 1953

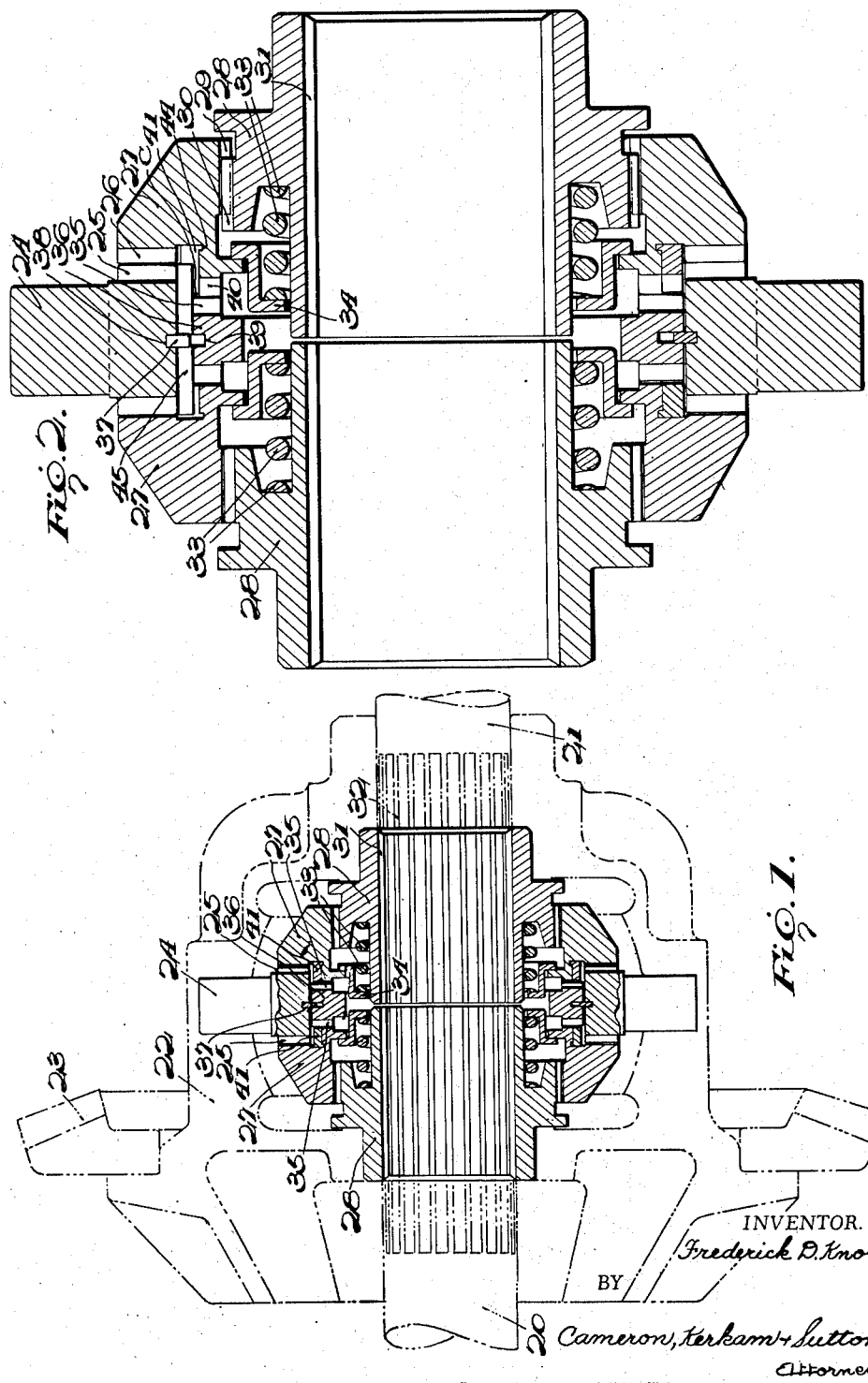

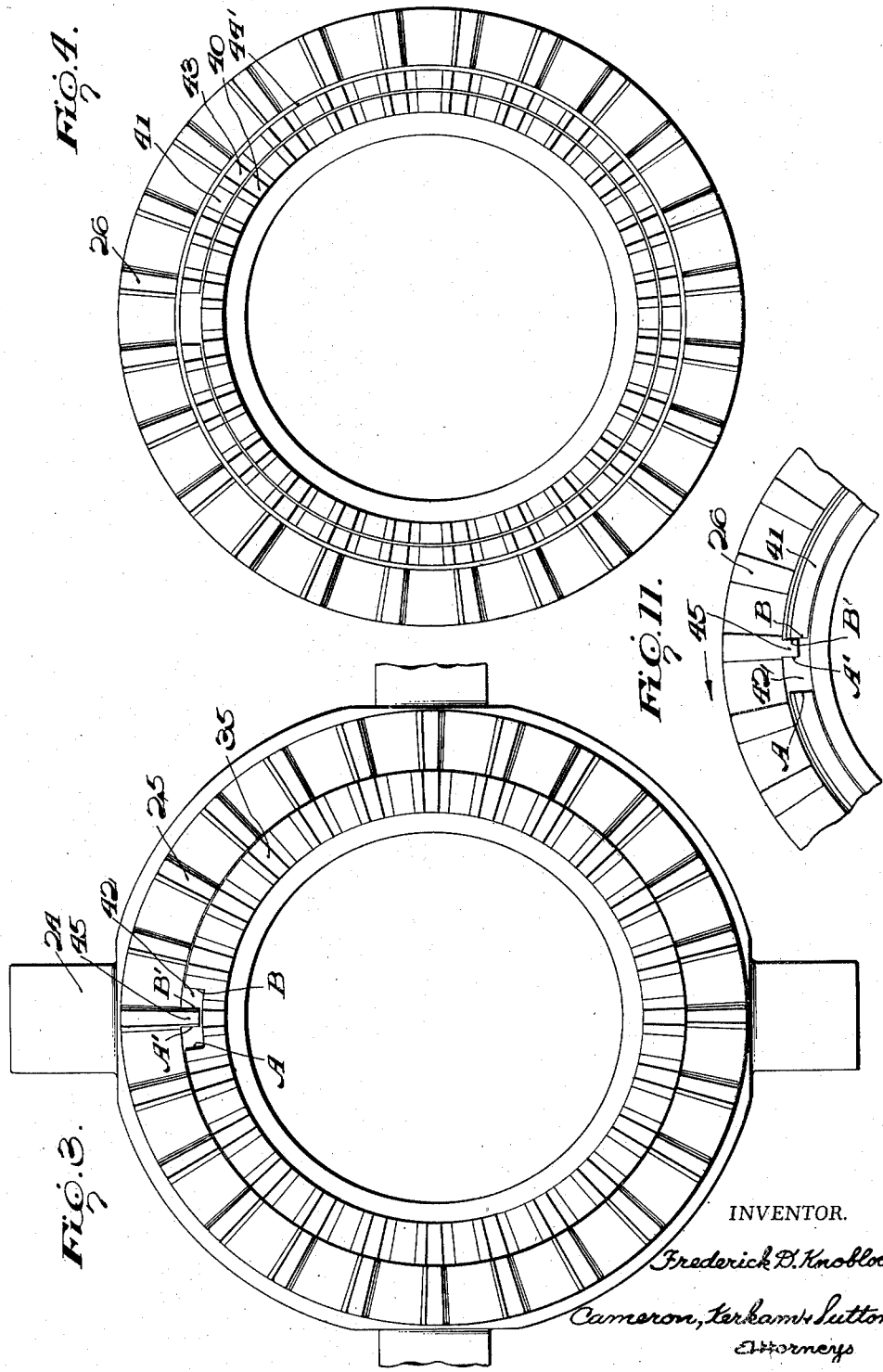

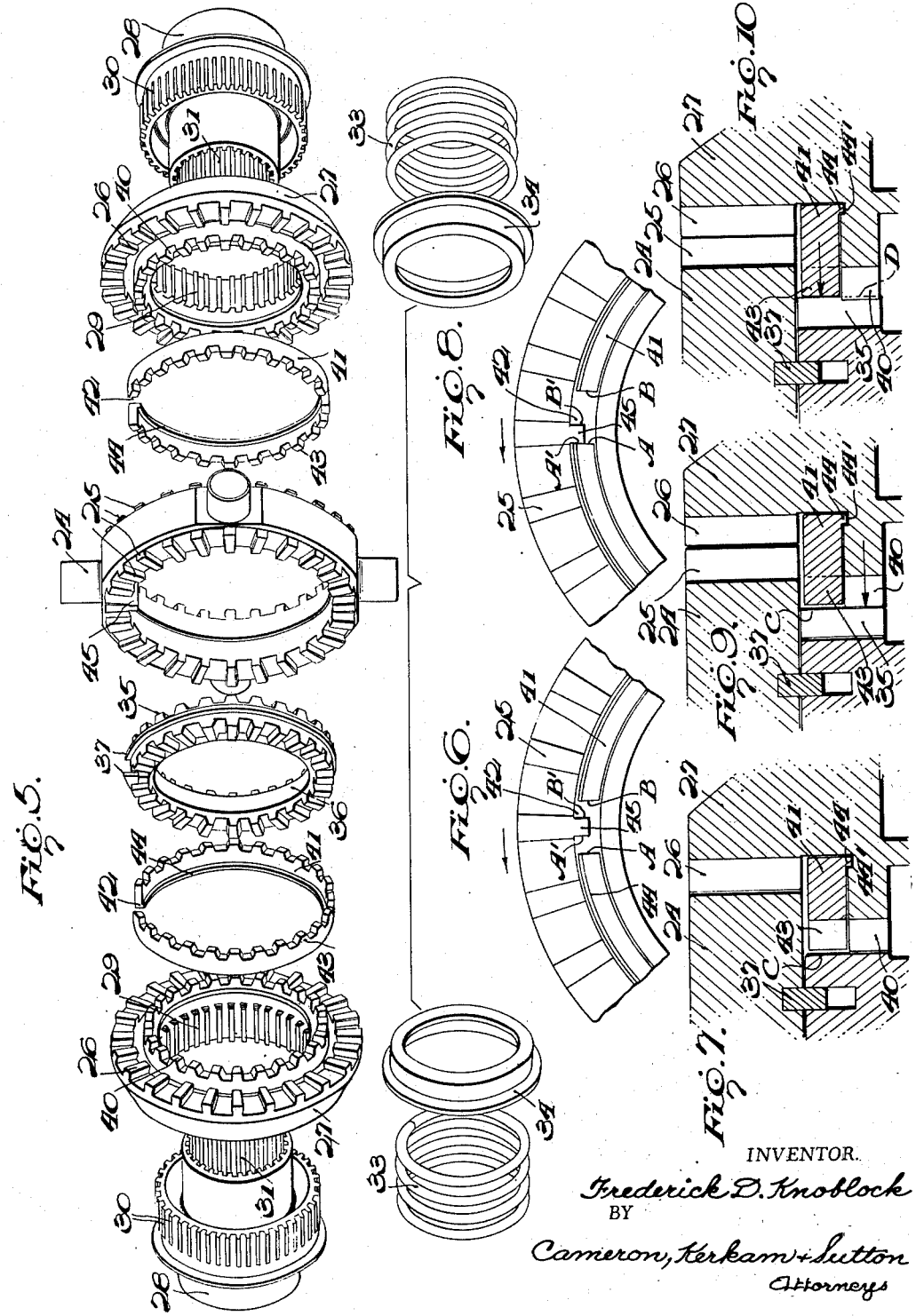

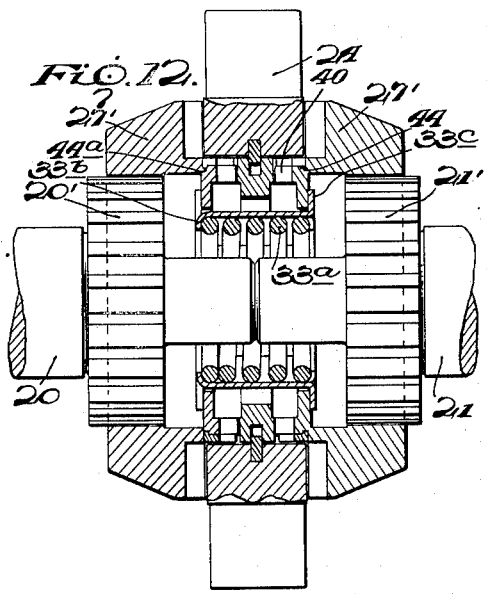
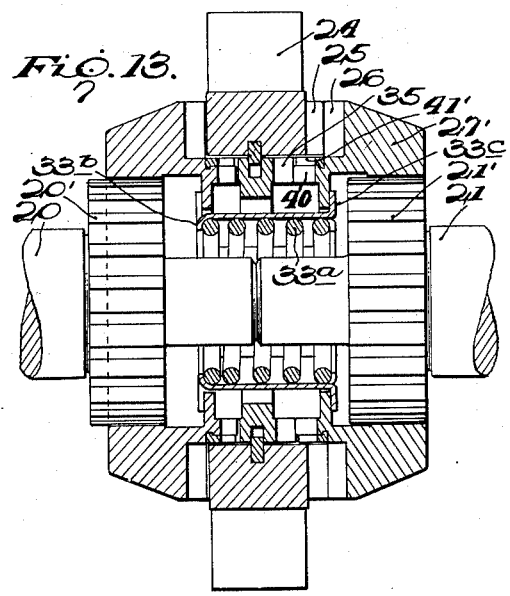
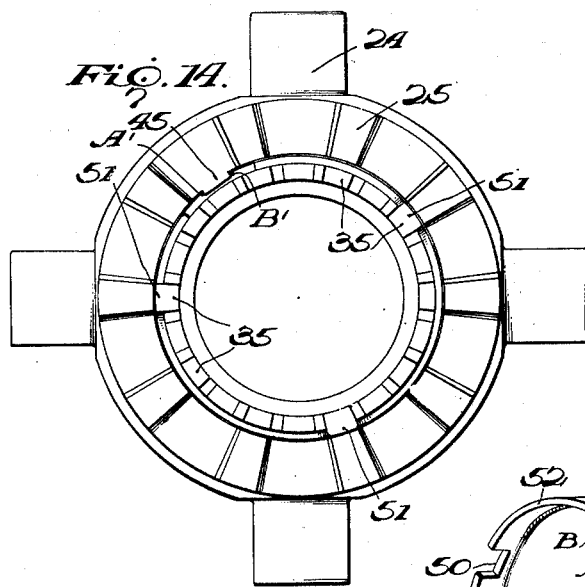
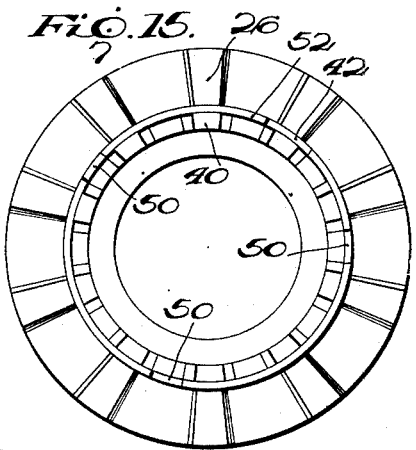
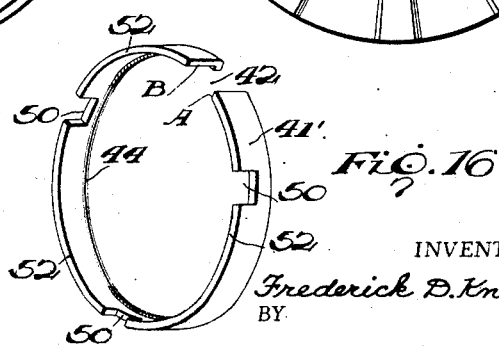

2,638,794

UNITED STATES PATENT OFFICE 2,638,794

DIFFERENTIAL MECHANISM

Frederick D. Knoblock, Birmingham, Mich., assignor to Patent Developers, Inc., Detroit, Mich., a corporation of Michigan Application April 13, 1949, Serial No. 87,280

22 Claims. (Cl. 74—650)

The present invention relates to differentials of the type wherein the driving and driven clutch members are automatically disengaged or demeshed in the overrunning operation, such as disclosed for example in Knoblock Patent No. 2,329,059 dated September 7, 1943.

The objects of the invention, among others, are to simplify and improve the operation of the differential, minimize the wear on the parts, prevent repeated meshing and demeshing of the clutch and cam members during the overrunning operation, eliminate the noise of the meshing and demeshing operation, and thus render the differential available for passenger and other cars where noise is a consideration.

In differentials of this type the demeshing in overrunning is against the compression of a spring or springs that operated heretofore to remesh the clutch members each time a cam tooth on the overrunning driven clutch registered with a cam tooth on the driving clutch member. This imposed a substantial burden on the spring, in view of the rapid rotation of the overrunning driven clutch member, inasmuch as it was fully deflected each time the driven cam rode up and down the ramp of each driving cam tooth. It was therefore necessary to provide a spring having a natural frequency greater than the impressed camming frequency, in order that the spring should properly follow the cam motion and exert even pressure at all times. It was often impossible in the space allotted to accommodate such a spring; and the spring design placed an upper limit on the number of teeth that could be incorporated in the differential. This is important because, as the number of teeth provided are decreased, the probability is lessened of the differential becoming fully engaged when differential action ceases, and this results in poor operation because only one wheel is driving when both should be, thus over-stressing the driven shaft and effecting a turning moment which must be overcome by steering effort.

Cam wear becomes very noticeable as the impressed camming frequency exceeds the natural frequency of the driven clutch member-spring assembly. This results in chipped clutch teeth and destruction of the differential. If there is gear reduction between the driven clutch members and the vehicle tires, as when the differential is installed in a transfer or drop case driving one or more axles, this camming frequency is increased by the axle ratio, which might be as much as ten times normal.

By the present invention wear on cam and clutch teeth due to lack of proper spring response is eliminated, especially in transfer cases or other adaptations where there is a gear reduction between the differential and the wheels. This latter is especially important in transfer cases located between driving axles of multiaxle vehicles, such as 4 x 4, 6 x 4, 6 x 6 and 8 x 8 trucks. In addition, the number of clutch teeth may be increased, which greatly improves the performance of the differential in axles of passenger cars and in front wheel drives.

The suppression of all the objectionable noise heretofore present in the meshing and demeshing clutch-cam type of overrunning differential is of the utmost importance in making the differential usable in passenger cars and other vehicles where noise is an important consideration, and the present invention solves a long-standing problem.

The stated objects are primarily attained by the provision of a member between the demeshing clutch and cam members that moves axially in the demeshing movement when overrunning starts, and that is moved rotarily with respect to the demeshing members and held in a position to prevent repeated meshing and demeshing of the clutch members until overrunning ceases, and which member is then moved rotarily to effect remeshing. This member which for brevity may be called a "silent cam" ring has an edge provided with elevations and depressions which may be teeth corresponding in number and shape with the driven cam teeth and normally aligned therewith when no differentiation takes place.

The action of the silent cam mechanism is to permit the overrunning driven clutch member to fully disengage and then to hold it in that position, or substantially so, until there is no relative speed between the two driven clutches, and then permit immediate full re-engagement. This re-engagement results when the applied torque is momentarily interrupted or reversed in direction, or also if there is a slight reversal in the differentiation. These reversals or changes can occur by slight changes in steering or application of throttle or brake or when driving over small bumps on the road. This action is transmitted to the spring, or springs, which tend to force the clutches together, so that the spring merely passes through one cycle of full deflection during this complete overrunning operation.

The height of the silent cam teeth is somewhat shorter than the height of the driven cam teeth; and in the overrunning action the spring thrust is either through the top surface of the driven member cam teeth engaging the outboard or top surface of the center cam teeth or the spring thrust is through the top surface of the silent cam teeth engaging the outboard or top surface of the center cam teeth. The clutch members are therefore held out of meshing engagement until overrunning ceases and until there is no relative speed between the two driven clutches, whereupon immediate full remeshing results. As heretofore stated this remeshing takes place when the applied torque is momentarily interrupted or reversed in direction and also if there is a slight reversal in the differentiation; and this action is transmitted to the spring or springs which tend to force the clutches together so that the spring merely passes through one cycle of full deflection during this complete overrunning operation rather than through a cycle of full deflection for each tooth as formerly.

The invention will be better understood by reference to the accompanying drawings, illustrating two embodiments of the inventive idea, and wherein Fig. 1 is a view of a differential showing both sides thereof engaged;

Fig. 2 is a sectional view showing the right-hand side of the differential overrunning and demeshed;

Fig. 3 is a face view of the spider, the driving clutch member and teeth thereon, and the center cam member carried thereby;

Fig. 4 is a view of a driven member showing the driven clutch teeth and the driven cam teeth with the silent cam member or ring therebetween;

Fig. 5 is an exploded view showing the various parts of the differential;

Fig. 6 is a detail showing the position of the key carried by the spider with respect to the slot or opening in the silent cam member or ring, the parts being in normal position when there is no differentiation;

Fig. 7 is a corresponding sectional detail showing the driving and driven clutch teeth fully meshed and the center cam teeth fully meshed with the driven cam teeth and the teeth on the silent cam member or ring;

Fig. 8 is a detail showing the position of the key carried by the spider with respect to the silent cam member or ring during the overrunning action;

Fig. 9 is a corresponding sectional detail showing the driving and driven clutch teeth fully demeshed and the ends of the teeth of the driven cam member engaging the outboard or top ends of the teeth of the center cam member, with the top of the silent cam teeth out of contact with the outboard edges of the center cam teeth;

Fig. 10 is a corresponding sectional view showing the driving and driven clutch teeth fully demeshed and the teeth of the driven cam member slightly meshed with the center cam teeth and with the top of the teeth on the silent cam member or ring engaging the outboard edges of the teeth of the center cam member;

Fig. 11 is a detail showing the position of the key carried by the spider with respect to the silent cam member or ring when the side of the clutch which was overrunning now underruns.

Figs. 12–16 show a modification in which

Fig. 12 is a part section and part elevation through a differential showing a single spring for both sides of the differential;

Fig. 13 is a similar view showing the right-hand side demeshed;

Fig. 14 is a face view of the spider and associated driving clutch and center cam teeth;

Fig. 15 is a face view of a driven member showing the driven clutch and cam teeth and the silent cam member or ring; and Fig. 16 is a perspective view of the silent cam member or ring.

Referring to the drawings, wherein like reference numerals indicate like parts, 20 and 21 are adjacent ends of two opposed shafts on which the differential is mounted; and 22 is a housing carrying the usual ring gear 23. A suitable driving member which is preferably a spider 24 is mounted in the housing 22 and rotates therewith. This spider 24 is provided on each face with driving clutch teeth 25 that engage driven clutch teeth 26 formed on two driven clutch members 27, one of which is associated with the shaft 20 and the other with the shaft 21. Each driven clutch member 27 is mounted on a sleeve 28 and is slidable therealong by the provision of splines 29 on the driven clutch members 27 engaging splines 30 on said sleeves 28. Sleeves 28 are preferably provided with a second set of splines 31 that engage splines 32 on shafts 20 and 21, though said sleeves may be keyed to said shafts or otherwise secured thereto.

A clutch disengaging or overrunning operation is effected when there is relative speed between the shafts 20 and 21 which causes one or the other of the driven clutch members 27 to slide axially outward along its associated sleeve member 28, as shown in Fig. 2. This movement compresses one of the two coiled springs 33 which reacts between its associated sleeve 28 and spring retainer 34.

The clutch disengaging operation is effected by the center cams and driven member cam teeth. The center cam teeth 35 are formed on a clutch disengaging member 36 mounted within the spider 24. This clutch disengaging member 36 is rotatable relative to the spider 24 but is prevented from axial movement relative thereto by suitable retaining means such as a snap ring 37 engaging a groove or recess in spider 24 and a registering groove or recess 39 in clutch disengaging member 36. The center cam teeth 35 on the clutch disengaging member 36 engage cam teeth 40 on the driven clutch member 27, the coaction being such that when there is relative movement between the shafts 20 and 21 a declutching and overrunning action is effected and the driven clutch teeth 26 are completely disengaged from the driving clutch teeth 25, as shown in Fig. 2.

Interposed between the clutch teeth and cam teeth on the axially movable driven members 27 which, in the illustrated embodiment, embody the driven member cam teeth 40 and the driven clutch teeth 26 is a silent cam member or ring 41 which is slotted at 42 and provided with teeth 43 which are normally aligned with driven member cam teeth 40. This silent cam ring 41 is provided with an inwardly projecting flange 44 that engages in a groove 44′ in the driven clutch member 27, so that the silent cam ring 41 partakes of the axial movement of the same. A key 45 on the spider 24 projects into the slot 42 of the silent cam ring 41 and in the normal operation of the differential when there is no overrunning the key 45 occupies a medial position therein as shown in Fig. 6. In this normal operation the teeth 43 on the silent cam ring 41 are in alignment with the driven member cam teeth 40 and both mesh with the center cam teeth 35, as shown in Figs. 1 and 7.

When overrunning takes place as, for example, when the speed of rotation of axle 21 exceeds that of axle 20, as shown in Fig. 2, the righthand side of the differential is disengaged or demeshed. The driven member cam teeth 40 ride up the ramps of the center cam teeth 35 and the parts assume the position shown in Fig. 2 with the driven clutch teeth 26 completely disengaged from the driving clutch teeth 25. The driven clutch teeth 26 and the driven member cam teeth 40 rotate clockwise from position shown in Fig. 6 carrying the silent cam ring 41 therewith until the edge A of the slot 42 engages the key 45 at A', as shown in Fig. 8. The silent cam ring 41 is held in the position shown in Fig. 8 as long as overrunning continues, but the driven clutch member 27 continues to rotate with the driven clutch teeth 26 and the driven member cam teeth 40, and the spring 33 tends to remesh the driven clutch teeth 26 with the driving clutch teeth 25 and the driven cam member teeth 40 with the center cam teeth 35.

The teeth 43 on the silent cam ring 41 are slightly shorter, preferably about .006", than the driven member cam teeth 40 as shown by the spacing C in Figs. 2, 7 and 9. If they were longer the silent cam ring teeth could not be moved to a position directly over the center cam teeth, because they have no rotatable frictional resistance with which to compress the spring 33. Thus the function of the silent cam of retaining full clutch disengagement would be destroyed.

During the overrunning action with the silent cam ring 41 in the position shown in Fig. 8 the driven clutch member 27 remains fully disengaged from the driving clutch on the spider and the spring 33 remains fully compressed, and all movement inwards towards the spider 24 is prevented by either the driven member cam teeth 40 being in engagement with the outboard or top surfaces of the center cam teeth 35 (Fig. 9), or the teeth 43 on the silent cam ring 41 being in engagement with the outboard or top surfaces of the center cam teeth 35 (Fig. 10).

In the condition shown at the arrow in Fig. 9 the pressure of the spring 33 is thus transmitted through driven cam member teeth 40, the outboard surfaces of center cam teeth 35, the snap ring 37, and spider 24 to casing 22. In the condition shown at the arrow in Fig. 10, after a rotation of one tooth of the driven member 27, the pressure of the spring 33 is transmitted through the teeth 43 on silent cam ring 41 to the outboard surfaces of the center cam teeth 35, the snap ring 37, and spider 24 to the casing 22.

Accordingly, during the overrunning operation as shown in Figs. 9 and 10, the driven clutch teeth 26 are completely disengaged or demeshed from the driving clutch teeth 25. Further, when the driven cam member teeth 40 engage the outboard edges of the center cam teeth 35, the teeth 43 on silent cam ring 41 are about .006" removed from the outboard edges of the center cam teeth 35; and when the teeth 43 on silent cam ring 41 contact the outboard surfaces of the center cam teeth 35 the driven member cam teeth 40 are only permitted to register or mesh with the center cam teeth 35 to the extent of .006" as shown by the dotted line D in Fig. 10. Accordingly, the burden heretofore imposed on the springs 33 when there was repeated full meshing and demeshing of the driving clutch teeth 25 and driven clutch teeth 26 has been removed, and the spring requirements with the present invention are reduced to a minimum.

It is emphasized that without the silent cam member or ring 41 the overrunning clutch must engage and disengage and fully deflect the spring 33 every time the overrunning cam rides up and down the ramp of each center cam 35 during the overrunning action; and this impresses a very high frequency on the spring which under these requirements must be designed for a natural frequency greater than this impressed frequency if the spring is to move the driven member 27 to properly follow the cam profiles and exert even pressure at all times.

With the present invention during the overrunning action the negligible compression and extension of the spring—about .006"—does not subject the spring to any appreciable displacement frequency; and the spring merely passes through one cycle of full deflection during this complete overrunning operation.

If the direction of the applied torque is not changed and if the wheel which was overrunning has its speed reduced below that of the other wheel and of the spider 24 the silent cam ring 41 will move away from the key 45 until the driven clutch teeth 26 become fully remeshed with the driving clutch teeth 25 on the spider 24. Unless this condition changes, the driven clutch teeth 26 on the other side of the spider 24 will now start to overrun, and the applied power will be transmitted to the newly engaged clutch. This condition will occur, for instance, if the vehicle first makes a right-hand turn and then goes into a left-hand turn without any noticeable change in the applied power.

If in the above condition of reversed differentiation the driven member cam 40 underruns the center cam 35 the silent cam ring 41 is carried by the driven member 27 as the silent cam ring 41 hugs the member 27 like a snap ring. If silent cam ring 41 refuses to underrun as the driven member cam 40 starts to underrun, because of frictional resistance of teeth 43 on silent cam ring 41 against the center cam teeth 35, this resistance is eliminated as soon as the top rounded edges of the driven member cam teeth 40 cam against the corresponding edges of the center cam teeth 35 and lift the silent cam teeth 43 off the center cam teeth 35 to the extent of .006". Thereafter silent cam ring 41 will underrun with the driven member cam teeth 40.

Now if the teeth 43 on silent cam ring 41 and the driven member cam teeth are in alignment they will drop into mesh with the center cam teeth 35, and the driving clutch teeth 25 and driven clutch teeth 26 will become fully engaged or meshed. If teeth 43 are not yet in alignment with driven member cam teeth 40 the underrunning of silent cam ring 41 will continue until its edge B contacts the edge B' of key 45 when it stops underrunning. The driven member cams 40, however, continue to underrun until the cams 40 start to descend the ramps of center cams 35. At this point the teeth 43 on silent cam ring 41 are no longer located or positioned to engage the outboard or top surfaces of center cam teeth 35 and keep the clutch teeth fully disengaged because silent cam ring 41 has been allowed to underrun to the new angular position of the key 45. The descent of the driven member cam teeth 40 down the ramps of center cam teeth 35 continues until the opposite cam faces of the center cam teeth 35 contact the ramps of silent cam teeth 43 and, assisted by the pressure of spring 33, pushes silent cam ring 41 over until the teeth 43 are in alignment with those of the driven member cam teeth 40. The clutch teeth 25 and 26 then become fully engaged or meshed and the spring 33 becomes fully extended.

If the vehicle which was accelerating starts to decelerate there will be a reversal in the direction of torque of the spider 24 with respect to the driven wheel. The driving clutch teeth 25 will rotate back with respect to the driven clutch member 27 taking up the backlash between the driving clutch teeth 25 and the driven clutch teeth 26. The center cam teeth 35 are still momentarily meshed with the driven member cam teeth 40. Thus the center cam teeth 35 now lead where they formerly lagged the driving clutch teeth 25. If the differential does not have a silent cam ring 41 and teeth 43 the wheel which was overrunning must become the engaged driving wheel and the wheel which was being driven will now underrun the spider 24. The same sequence of events will occur with the present invention employing the silent cam ring 41 because when the spider 24 reverses its direction of torque with respect to the previously engaged clutch member 27 the spider key 45 pushes against the advancing edge A of the silent cam ring 41 (as in Fig. 8) and rotates the silent cam ring 41 backwards so that its teeth 43 are no longer opposite center cam teeth 35. As differentiation progresses the driven member cam teeth 40 can now descend the ramps of the center cam teeth 35 since the silent cam teeth 43 are not directly over the center cam teeth 35 to stop further descent. Thus the descending driven member cam teeth 40 move further into mesh with the center cam teeth 35 until the ramps on the other side of center cam teeth 35 contact the ramps on teeth 43. Aided by the pressure of spring 33 this contact pushes the silent cam ring 41 backwards, moving its advancing edge A away from the key 45 until its teeth 43 are in line with the teeth 40 on the driven clutch member 27 and the previously overrunning driven clutch teeth 26 fully engaged with the driving clutch teeth 25. Further differentiation forces the other driven clutch teeth 26 to become fully disengaged from the driving clutch teeth 25 as they underrun the driving clutch teeth 25 on the spider 24. This clutch continues to underrun fully disengaged until there is a change either in torque direction or differentiation.

Figs. 12-16 inclusive show a modifiaction of the silent cam member or ring 41' applied to the differential construction of the type shown in Myers Patent No. 2,329,075 dated September 7, 1943.

This modified differential construction employs a single spring 33a for yieldably urging the driven members 27' inwardly toward the spider 24 to mesh the driven clutch teeth 26 with the driving clutch teeth 25 and the driven member cam teeth 40 with the center cam teeth 35. The construction is symmetrical on both sides of a transverse plane passing through the center of the spider 24. The driving clutch teeth 25 and center cam teeth 35 are carried by the spider 24 and the driven clutch teeth 26 and driven member cam teeth 40 are carried by the driven members 27' which, in the present embodiment, mesh with members 20' and 21' formed integrally on axles 20 and 21.

The spring 33a is carried in a substantially cylindrical cage and is slightly compressed axially when placed therein and while so retained the cage members are bent inwardly at 33b locking the spring within the cage so formed. Fanges 33c on the cage engage projections on the driven members 27'. Accordingly the driven members 27' are at all times yieldably urged inwardly toward the driving clutch and cam members, and outward movement of the driven clutch and cam members is yieldably opposed by the spring 33a.

In Fig. 16 is shown the modified silent cam member or ring 41'. This ring is slotted at 42 to accommodate the key 45 on the spider 24 but said ring 41' is not provided with teeth corresponding in shape and number with the driven member cam teeth 40 as in the embodiment of Figs. 1-11, but is provided with notches 50, here shown as three in number, which normally engage over extensions 51 formed on three of the center cam teeth 35. Elevations 52 are formed between notches 50 and between the latter and slot 42. This ring 41' is also provided with a laterally extending flange 44 which engages in a recess 44a in the driven member 27', the ring being positioned between the driven clutch teeth 26 and the driven cam teeth 40 and thus moves axially with driven member 27'.

In the present embodiment when there is no differentiation the key 45 is positioned in slot 42 and out of engagement with the edges A and B thereof. When one axle overruns, as for example axle 21, the ring 41' moves axially with the driven member 27' and then rotarily therewith until edge A of slot 42 engages the key 45 at A' and stops the rotary movement of ring 41'. At this time the driven clutch teeth 26 are demeshed from driving clutch teeth 25 and driven member cam teeth 40 from center cam teeth 35 and the elevations 52 between the notches 50 bear upon the extensions 51 of center cam teeth 35 and prevent the remeshing of the driven clutch teeth 26 with driving clutch teeth 25 and driven member cam teeth 40 with center cam teeth 35 as long as overrunning continues.

It has been found that a construction embodying three spaced notches 50 and four elevations 52 is satisfactory in operation. These elevations 52 extend over any desired number of driven cam teeth 40 and are also about .006" less in height then the height of the driven member cam teeth 40 for the same reasons as before stated in the embodiment of Figs. 1-11, inclusive. The top corners of notches 50 are slightly rounded to facilitate engagement with and disengagement from extensions 51.

When overrunning ceases and momentarily reverses the ring 41' will be rotated in a counterclockwise direction and the edge B of slot 42 will engage key 45 at B' whereupon the driving and driven clutch members 25 and 26, respectively, and center and driven cam members 35 and 40, respectively, will, with the assistance of spring 33a, remesh and resume their normal driving position.

One of the advantages of the present embodiment is the simplicity of construction of the silent cam member or ring 41' and the readiness and cheapness of manufacture.

The inventive idea is susceptible of various mechanical embodiments aside from that herein illustrated, and reference is to be had to the appended claims for a definition of the scope of the invention.

What is claimed is:

1. In a differential for a pair of opposed axles characterized by meshing and demeshing driving and driven clutch and cam members, one set of clutch and cam members being demeshed by axial movement against spring pressure when its associated axle overruns, the provision of a toothed ring movable axially with the demeshed clutch and cam members and rotatable in one direction relative thereto to prevent remeshing during overrunning and rotatable in the opposite direction to permit remeshing when overrunning ceases and underrunning takes place the teeth on said ring being slightly shorter than the cam teeth on the driven member.

2. In a differential for a pair of opposed axles characterized by meshing and demeshing driving and driven clutch and cam members one set of clutch and cam members being demeshed by axial movement against spring pressure when its associated axle overruns, the provision of a slotted ring having an interrupted outer edge which ring is movable axially with the demeshed set, a key engaging in the slot in said ring, means rotating said ring in one direction until one boundary of said slot engages said key to prevent remeshing of said demeshed set during overrunning thereof and rotating said ring in the opposite direction to permit remeshing by a reversal of driving torque the teeth on said ring being slightly shorter than the cam teeth on the driven member.

3. In a differential for a pair of opposed axles characterized by meshing and demeshing driving and driven clutch and cam members one set of clutch and cam members being demeshed by axial movement against spring pressure when its associated axle overruns, the provision of a slotted ring having a toothed outer edge which ring is movable axially with the demeshed set, a key engaging in the slot in said ring, means rotating said ring in one direction until one boundary of said slot engages said key to prevent remeshing of said demeshed set during overrunning thereof and rotating said ring in the opposite direction until the other boundary of said slot engages said key and thereby positioning said ring to permit remeshing when overrunning ceases and underrunning takes place.

4. In a differential for a pair of opposed axles characterized by meshing and demeshing driving and driven clutch and cam members one set of clutch and cam members being demeshed by axial movement against spring pressure when its associated axle overruns, the provision of a slotted ring adjacent the clutch and cam teeth on the driven member and being secured at one edge thereto to move axially therewith when its associated axle overruns and the other edge of said ring being interrupted, a key engaging in the slot in said ring, means rotating said ring in one direction until one boundary of said slot engages said key to prevent remeshing of said demeshed set during overrunning thereof and rotating said ring in the opposite direction until the other boundary of said slot engages said key to permit remeshing when the direction of overrunning reverses.

5. In a differential for a pair of opposed axles characterized by a spider, a pair of driving clutch and cam members at each side of the spider, driven clutch and cam members meshing with the driving clutch and cam members carried by the spider the clutch and cam members being demeshed by axial movement against spring pressure when the speed of rotation of one axle exceeds that of the other, the provision of rings adjacent the axially movable clutch and cam members and movable axially therewith, one edge of each ring being provided with depressions to fit opposed cam teeth when the clutch members are meshed and provided with elevations on said edge to engage the top surfaces of opposed cam teeth when the clutch members are demeshed, means to rotate said ring in one direction and position it with its elevations opposite opposed cam teeth to prevent remeshing of the demeshed clutch and cam members while overrunning continues, and means for rotating said ring in the opposite direction to permit remeshing of the clutch and cam members when overrunning ceases and the direction of driving torque is reversed.

6. In a differential for a pair of opposed axles characterized by a spider, a pair of driving clutch and cam members at each side of the spider, driven clutch and cam members meshing with the driving clutch and cam members carried by the spider the clutch and cam members being demeshed by axial movement against spring pressure when the speed of rotation of one axle exceeds that of the other, the provision of slotted rings, a key on the spider projecting in the slot in each ring, the rings being carried by the axially movable clutch and cam members and movable axially therewith, one edge of each ring being provided with depressions to fit around opposed cam teeth when the clutch members are meshed and provided with elevations on said edge to engage the top surfaces of opposed cam teeth when the clutch members are demeshed, means to rotate said ring in one direction and position it with its elevations opposite opposed cam teeth to prevent remeshing of the demeshed clutch and cam members while overrunning continues, and means for rotating said ring in the opposite direction to permit remeshing of the clutch and cam members when overrunning ceases and reverses one boundary of the slot in the ring on the demeshing side engaging the key during overrunning and the other boundary of the slot engaging the key when overrunning ceases and reverses.

7. In a differential provided with a spider carrying on each side driving clutch teeth and driving cam teeth adapted to engage driven clutch teeth and driven cam teeth which teeth disengage by overrunning, the combination of a toothed ring interposed between the driven clutch teeth and driven cam teeth and having teeth normally aligned with the driven cam teeth and movable axially therewith against spring pressure, means automatically shifting said ring rotatably in one direction to prevent the driven clutch teeth from remeshing with the driving clutch teeth during overrunning and rotating said ring in the other direction to permit remeshing of the clutch members the teeth on said ring being slightly shorter than the cam teeth on the driven member.

8. In a differential provided with driving clutch and cam members and driven clutch and cam members which members disengage by overrunning, the combination of a ring interposed between the driven clutch teeth and the driven cam teeth on the driven clutch member and movable axially therewith against spring pressure in the disengaging movement and means engaging said ring and shifting the same rotatably in one direction to prevent reengagement of the driving and driven clutch members during overrunning and shifting in the other direction to permit remeshing of the clutch members the teeth on said ring being slightly shorter than the cam teeth on the driven member.

9. In a differential provided with driving clutch and cam members and driven clutch and cam members which members disengage by overrunning, the combination of a ring carried by and connected at one edge to the driven clutch and cam members and movable axially therewith against spring pressure and means shifting said ring rotatably in one direction into position to prevent engagement on the overrunning side of the driving and driven clutch members during overrunning whereby the spring passes through one cycle of full deflection during the complete overrunning operation and not a cycle of full deflection for each tooth and shifting in the other direction to permit remeshing of the clutch members.

10. In a differential provided with a spider and driving clutch and cam members on each side thereof and associated axially movable driven clutch and cam members which members disengage during overrunning, the combination of a key on the spider, an open ring carried by the driven clutch and cam members on each side of the spider, each of said rings being rotatable relative to the driven clutch and cam member by which it is carried and movable axially therewith, the key being positioned between the open ends of the rings and engaging the boundaries of the open ends of said rings to rotate the same relative to the driven clutch and cam members during overrunning and underrunning action.

11. In a differential for a pair of opposed axles characterized by meshing and demeshing driving and driven clutch and cam members one set of clutch and cam members being demeshed by axial movement against spring pressure when its associated axle overruns, the provision of a ring movable axially with the demeshed clutch and cam members and rotatable in one direction relative thereto to prevent remeshing of the cam teeth during overrunning the spring pressure during overrunning being transmitted to the top faces of the driving cam teeth alternately through the driven cam teeth and the ring.

12. In a differential for a pair of opposed axles characterized by meshing and demeshing driving and driven clutch and cam members one set of clutch and cam members being demeshed by axial movement against spring pressure when its associated axle overruns, the provision of a toothed ring movable axially with the demeshed clutch and cam members and rotatable in one direction relative thereto to prevent remeshing of the cam teeth during overrunning the spring pressure during overrunning being transmitted to the top faces of the center cam teeth alternately through the driven member cam teeth and the teeth on the ring and rotating said ring in the opposite direction to permit remeshing when overrunning ceases.

13. In a differential for a pair of opposed axles characterized by meshing and demeshing driving and driven clutch and cam members provided with teeth one set of clutch and cam members being demeshed by axial movement against spring pressure when its associated axle overruns, the provision of extensions on a plurality of the cam teeth, a ring provided with notches engaging over said extensions in the absence of differentiation and elevations between said notches engaging said extensions during the overrunning operation.

14. In a differential for a pair of opposed axles characterized by a spider and meshing and demeshing driving and driven clutch and cam members provided with teeth one set of clutch and cam members being demeshed by axial movement against spring pressure when its associated axle overruns, the provision of a slotted ring, a key on the spider engaging in said slot, certain of said cam members being provided with extensions, and notches and elevations on the edge of said ring the notches engaging around said extensions in the absence of differentiation and the elevations engaging said extensions during the overrunning operation.

15. In a differential for a pair of opposed axles characterized by a spider and meshing and demeshing driving and driven clutch and cam members provided with teeth one set of clutch and cam members being demeshed by axial movement against spring pressure when its associated axle overruns, the provision of extensions on a plurality of said cam teeth, a ring carried by the axially movable clutch and cam members and movable axially therewith and rotatably thereof said ring being provided with notches and elevations between said notches, said notches engaging around said extensions in the absence of differentiation, and said elevations engaging said extensions during overrunning.

16. In a differential for a pair of opposed axles characterized by a spider and meshing and demeshing driving and driven clutch and cam members provided with teeth one set of clutch and cam members being demeshed by axial movement against spring pressure when its associated axle overruns, the provision of extensions on a plurality of said cam teeth, a ring carried between the axially movable clutch and cam members and movable axially therewith and rotatably thereof said ring being provided with a slot and notches and elevations between said notches, a key engaging in said slot and limiting the rotary movement of said ring, said notches engaging around said extensions in the absence of differentiation and said elevations engaging said extensions during overrunning.

17. In a differential for a pair of opposed axles characterized by meshing and demeshing driving and driven clutch and cam members one set of clutch and cam members being demeshed by axial movement against spring pressure when its associated axle overruns, the provision of a toothed ring movable axially with the demeshed clutch and cam members and rotatable in one direction relative thereto to prevent remeshing during overrunning the spring pressure during overrunning being transmitted to the top faces of the center cam teeth alternately through the driven member cam teeth and the teeth on the ring and rotating said ring in the opposite direction to permit remeshing when overrunning ceases, the teeth on the ring being slightly shorter than the cam teeth on the driven member.

18. In a differential for a pair of opposed axles characterized by two sets of meshing and demeshing driving and driven clutch members wherein one set of said clutch members becomes disengaged by axial movement of one clutch member against the pressure of a spring when its associated axle overruns the other axle, the provision of a ring movable axially with each of the axially movable clutch members and rotatable relative thereto, and means for rotating said rings in one direction relative to the associated clutch members when the latter are demeshed upon overrunning, said rings having cam surfaces which, upon rotation of said rings in said one direction, prevent remeshing of the demeshed clutch members and permit substantially full spring deflection as long as the overrunning continues.

19. In a differential for a pair of opposed axles characterized by two sets of meshing and demeshing driving and driven clutch members wherein one set of said clutch members becomes disengaged by axial movement of one clutch member against the pressure of a spring when the associated axle overruns the other axle, the provision of a ring movable axially with each of the axially movable clutch members and rotatable relative thereto, means for rotating said rings in one direction relative to the associated clutch members when the latter are demeshed upon overrunning, said rings having cam surfaces which, upon rotation of said rings in said one direction, prevent remeshing of the demeshed clutch members and permit substantially full spring deflection as long as the overrunning continues, and means for rotating said rings in the opposite direction relative to the associated clutch members when the overrunning ceases to permit remeshing of the demeshed clutch members, the change in the compression of the spring being negligible during overrunning.

20. A differential mechanism of the class described comprising a driving member, a pair of driven members, a pair of axially shiftable clutch elements and a cooperating pair of axially fixed clutch elements for transmitting torque from said driving member to said driven members, a ring rotatably mounted on each of said axially shiftable clutch elements, cam surfaces on said rings and cooperating cam surfaces associated with said pair of axially fixed clutch elements adapted to permit engagement of said axially shiftable clutch elements with their respective axially fixed clutch elements when the velocities of said driving member and both of said driven members are the same, and means in addition to said ring and cam surfaces for causing the axial separation of one axially shiftable clutch element and its cooperating fixed clutch element when the velocity of the respective driven member is different than the velocity of said driving member, said cam surfaces maintaining said axial separation so long as said difference in velocities exists.

21. A differential mechanism of the class described comprising a driving member, a pair of driven members, a pair of axially shiftable clutch elements and a cooperating pair of axially fixed clutch elements for transmitting torque from said driving member to said driven members, yielding means normally urging said axially shiftable clutch elements into engagement with said axially fixed clutch elements, a ring rotatably mounted on each of said axially shiftable clutch elements, cam surfaces on said rings and cooperating cam surfaces associated with said pair of axially fixed clutch elements adapted to permit engagement of said axially shiftable clutch elements with their respective axially fixed elements when the velocities of said driving member and said driven members are the same, and means in addition to said ring and cam surfaces for causing the axial separation of one axially shiftable clutch element and its cooperating fixed clutch element when the velocity of the respective driven member is different than the velocity of said driving member, said cam surfaces maintaining said axial separation so long as said difference in velocities exists.

22. A differential mechanism of the class described comprising a driving member, a pair of driven members, a pair of axially shiftable clutch elements and a cooperating pair of axially fixed clutch elements for transmitting torque from said driving member to said driven members, said axially shiftable clutch elements having annular grooves formed on their faces opposed to said axially fixed clutch elements, a ring rotatably mounted in the annular groove of each of said axially shiftable clutch elements, cam surfaces on said rings and cooperating cam surfaces associated with said pair of axially fixed clutch elements adapted to permit engagement of said axially shiftable clutch elements with their respective axially fixed clutch elements when the velocities of said driving member and said driven members are the same, and means in addition to said ring and cam surfaces for causing the axial separation of one axially shiftable clutch element and its cooperating fixed clutch element when the velocity of the respective driven member is different than the velocity of said driving member, said cam surfaces maintaining said axial separation so long as said difference in velocities exists.

FREDERICK D. KNOBLOCK.

References Cited in the file of this patent

UNITED STATES PATENTS

| Number | Name | Date |
|---|---|---|
| 1,987,426 | Warren | Jan. 8, 1935 |
| 2,175,520 | Frederickson | Oct. 10, 1939 |
| 2,231,968 | Thornton | Feb. 18, 1941 |
| 2,315,299 | Thornton | Mar. 30, 1943 |
| 2,329,059 | Knoblock | Sept. 7, 1943 |
| 2,329,075 | Myers | Sept. 7, 1943 |
| 2,348,717 | Banker | May 16, 1944 |
| 2,385,864 | Knoblock | Oct. 2, 1945 |
| 2,399,098 | Carnagua | Apr. 23, 1946 |
| 2,488,044 | Voigt | Nov. 15, 1949 |
| 2,555,044 | Lewis | May 29, 1951 |